United States Patent [19]

Salour

[11] Patent Number: 4,764,739

[45] Date of Patent: Aug. 16, 1988

[54] LIGHT-INDUCED UNIDIRECTIONAL LIGHT SWITCH

[75] Inventor: Michael M. Salour, Cambridge, Mass.

[73] Assignee: The United States of America as represented by the Secretary of the Navy, Washington, D.C.

[21] Appl. No.: 96,249

[22] Filed: Sep. 8, 1987

Related U.S. Application Data

[63] Continuation of Ser. No. 310,939, Oct. 13, 1981, abandoned.

[51] Int. Cl.$^4$ .................... H01S 3/00; H01S 3/113; H03K 23/78
[52] U.S. Cl. .................... 332/751; 377/102; 373/11; 373/21; 330/43
[58] Field of Search .................... 377/102

[56] References Cited

U.S. PATENT DOCUMENTS 4,019,156  4/1977  Fountain et al. .................... 372/18
4,291,282  9/1981  Alfonso et al. .................... 372/18
4,375,684  3/1983  Everett .................... 372/18

OTHER PUBLICATIONS

Petite et al., "Observation of . . . Light Shifts", 8/8/80, pp. 1-5, Ntis AD-A093 944/7.
Petite et al., "Observation of . . . Light Shifts", 10/13/80, pp. 1242-1245, Phys. Rev. Lett., vol. 45, #15.
Cohen et al., "Compensating Doppler . . . Shifts," 10/78, pp. 71-75, Opt. Commun., vol. 27, #1.
Raymond et al., "Compensation of . . . Light Shifts," 1979, pp. 96-105, vol. 4.

Primary Examiner—Nelson Moskowitz
Attorney, Agent, or Firm—Prithvi C. Lall; Arthur A. McGill; Michael J. McGowan

[57] ABSTRACT

A light induced unidirectional light switch is described wherein a unidirectionally emitting medium is obtained using the method of Doppler compensation by light-induced velocity-dependent light shifts. The emission in the emitting medium can be switched on by a pulse of laser light which acts as a light induced light switch.

6 Claims, 3 Drawing Sheets

LIGHT-INDUCED UNIDIRECTIONAL LIGHT SWITCH

This application is a continuation of application Ser. No. 310,939, filed Oct. 13, 1981, now abandoned.

This patent application is co-pending with my related application Ser. No. 310,938 entitled "Light-Induced Unidirectional Light Amplifier" filed on Oct. 13, 1980, the same date as for subject patent application.

BACKGROUND OF THE INVENTION

This invention relates to non-linear optical processes in gas phases and, more particularly, to a unidirectionally light induced switch.

With advances in non-linear optical processes in gas phases, it is desirable to study ultrafast coherent transient spectroscopic techniques to probe the basic physics of non-linear interactions of light with matter. It is particularly useful to use the light shift induced by the interaction of atoms with intense monochromatic light which can be used to compensate for Doppler broadening. It is usually preferable to implement high intensity lasers using gaseous media instead of solid media in order to avoid destructive thermal stress on solid materials used in such systems. However, the atoms of a gaseous medium experience thermal motion due to their not being locked into a relatively rigid lattice structure. Consequently, if excited gaseous atoms emit light, the photons so emitted have a range of thermal velocities which causes a Doppler shift (i.e. change in frequency of the photons or radiation) along the axis of observation. This effect gives rise to Doppler broadening of the radiation with the result that the energy is spread over a larger bandwidth of frequency of the photons. However, if the excited gaseous atoms are subjected to monochromatic light of appropriate wavelength from a laser, the energy levels of the excited atoms may be shifted as a result of Stark effect due to the electromagnetic field of the impinging radiation from the laser. Such shifts in the energy levels are velocity-dependent and can be used to obtain Doppler free radiation. Cohen-Tannoudji et al first demonstrated theoretically in their paper entitled "Compensating Doppler Broadening with Light Shifts", Optics Communications, Vol. 27, pp. 71–75 (October 1978) that an external laser could be used to compensate for Doppler shift of the emitted radiation from excited atoms by arranging the velocity-dependent light-induced effect to be complementary and thus the two effects cancelling each other. Reynaud et al in their paper entitled "Compensation of Doppler Broadening by a Velocity-Dependent Light-Shifts", Laser Spectroscopy, Vol. 4 (1979) pp. 96–105 discuss on pages 98, 104, observed Doppler-free spectral lines in an experiment on neon and thus demonstrated forward-/backward asymmetry for the emitted radiation. However, the true unidirectionality of the emitted radiation and its amplification characteristic beyond a threshold was not experimentally demonstrated and it was considered desirable to explore these aspects. It is thus desirable to have a light-induced unidirectional light switch which can replace a light switch involving solid medium.

SUMMARY OF THE INVENTION

The objects and advantages of the present invention are accomplished by using the principal wherein the single state $|a>$ of a $|c> \rightarrow |a>$ atomic transition is coupled to a doublet $|b_+>$, $|b_->$ by a laser tuned between $|a> \rightarrow |b_+>$ and $|a> \rightarrow |b_->$ resonances. There is a frequency $\omega_{Lo}$ around which the peturbed energy of $|a>$ depends linearly on $\omega_L - \omega_{Lo}$ where $\omega_L$ is the frequency seen by an atom in the rest frame. With the laser tuned to $\omega_{Lo}$, a moving atom will see a laser frequency detuned from $\omega_{Lo}$ by an amount proportional to its velocity (Doppler shift). The frequency shift of the $|c> \rightarrow |a>$ transition will, therefore, be proportional to this velocity. The constant of proportionality can be set by choosing the laser intensity so that the light-induced shifts and Doppler shifts of the $|c> \rightarrow |a>$ transition cancel for the emission in the direction of propagation of the laser beam, and add in the backward direction to double the Doppler broadening. If we consider an inverted medium with respect to $|c> \rightarrow |a>$ transition, it will emit photons and stimulated emission dominates in the form of an avalanche effect if the gain is large enough. This type of emission is known as superfluorescence which is subject to a threshold-like condition wherein the threshold is exceeded when $g(\omega) \, l. \Delta\omega) > 20$ where $g(\omega)$ is the gain or amplification per unit of interaction length per unit bandwidth associated with the radiation of frequency $\omega$, $l$ is the interaction length and $\Delta\omega$ is the bandwidth of the line. Thus, Doppler broadening is an important limitation to the maximum amplitude of superfluorescence. Compensation of Doppler effect brings the gain bandwidth from the Doppler width (approximately 1 gigahertz, $GHz = 10^9$ cycles/sec) down to the natural width of emitting transition (approximately 50 megahertz MHz) thus leading to an important increase in the gain amplitude for superfluorescence. Since the amplitude of superfluorescence is also proportional to the population inversion on the $|c> \rightarrow |a>$ transition, Doppler compensation will lead to a dramatic decrease of the threshold population inversion beyond which superfluorescence is allowed to develop. Using the Doppler compensation method as described above, it is possible to switch the emitting medium into a fast superfluorescence decay state, through introduction of a compensating laser pulse. This fast decay liberates a pulse of light that otherwise would not appear, so the compensating laser "switches on" this light. Besides, if the compensating laser is turned off, the emitting medium will resume the normal fluorescent state, i.e. superfluorescence is "switched off". Since one of the main features of the Doppler compensation method by velocity-dependent light shift is its high degree of anistrophy and non-linearity, it provides a method of light-induced light switching in a unidirectionally amplifying medium. Due to the high non-linearity of the system, one can expect high anistrophy or switching to be obtained even by only partial compensation of the Doppler effect.

In particular, a light induced unidirectional light switch is accomplished by using sodium vapor as the medium and a pump laser of wavelength 685.6 nm (1 $nm = 10^{-9}$ meters) to pump two photons of wavelength 6856° Å ($1°Å = 10^{-10}$ meter) to populate $3D_{3/2, \, 5/2}$ states of sodium and causing population inversion between states $3D_{3/2, \, 5/2}$ and $3P_{\frac{1}{2}}$. A compensating laser of tunable wavelength of 568.8 nm is used to cause velocity-dependent light shift to compensate for the Doppler shift and thus obtain an anisotropic medium used for light-induced light switch of subject invention.

An object of subject invention is to have a light induced unidirectional light switch.

Another object of subject invention is to obtain an anisotropic medium using a laser light source by achieving Doppler compensation using velocity-dependent light shifts.

Still another object of subject invention is to provide a method of light-by-light switching in a unidirectional and amplifying medium.

Other objects, advantages and novel features of the invention will become apparent from the following detailed description of the invention when considered in conjunction with the accompanying drawings wherein:

DESCRIPTION OF A PREFERRED EMBODIMENT

Figure 1:
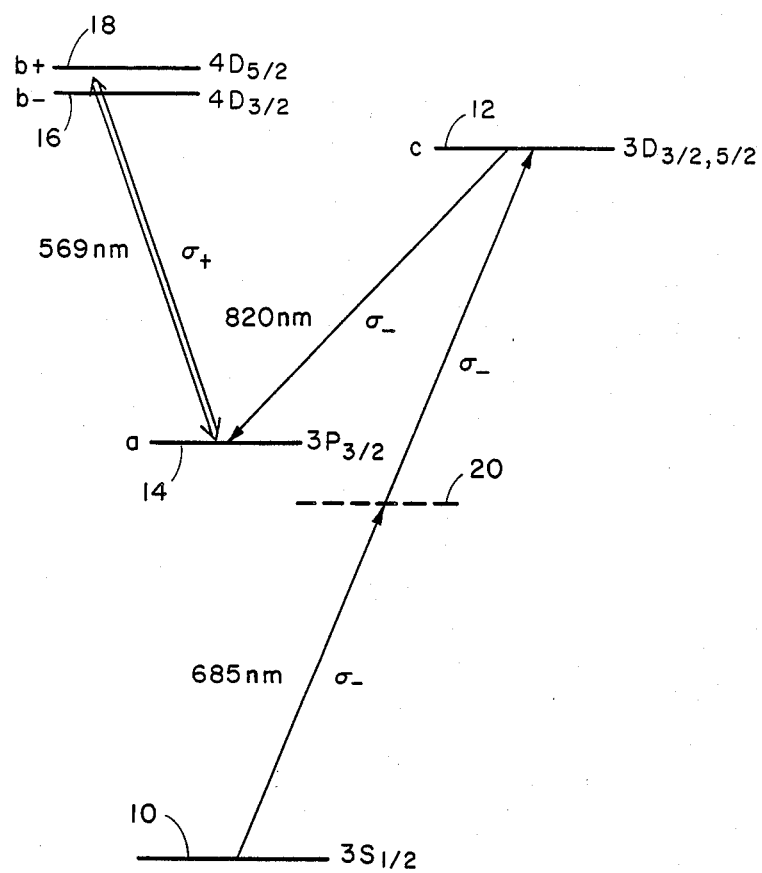
FIG. 1 is a schematic representation of the atomic transitions involved in the analysis of subject invention wherein sodium vapor is used as the medium.
Figure 3:
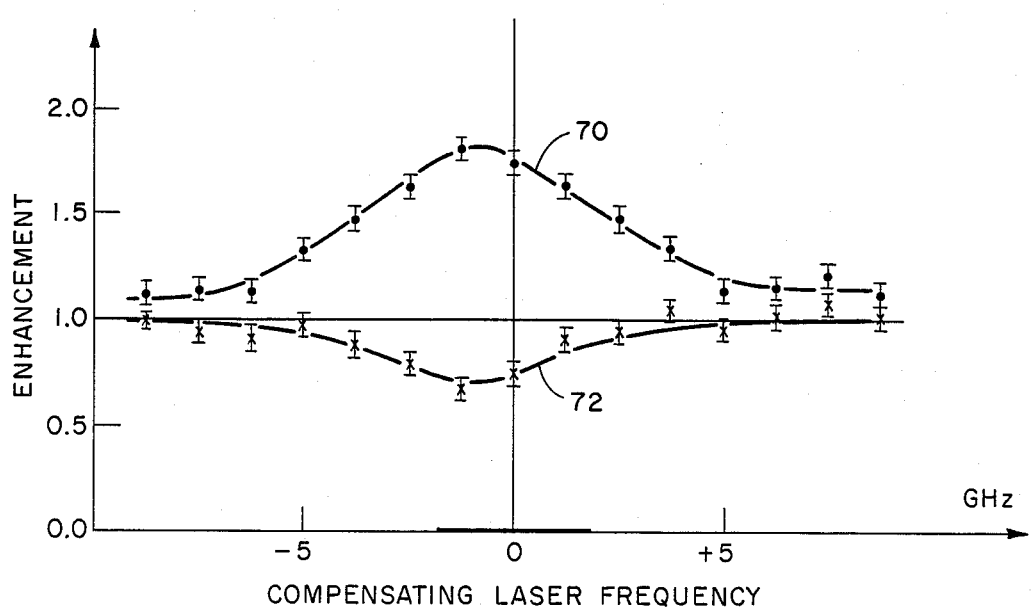
FIG. 3 is a graphical representation of the forward-/backward enhancement of light as a function of compensating laser frequency.
Figure 2:
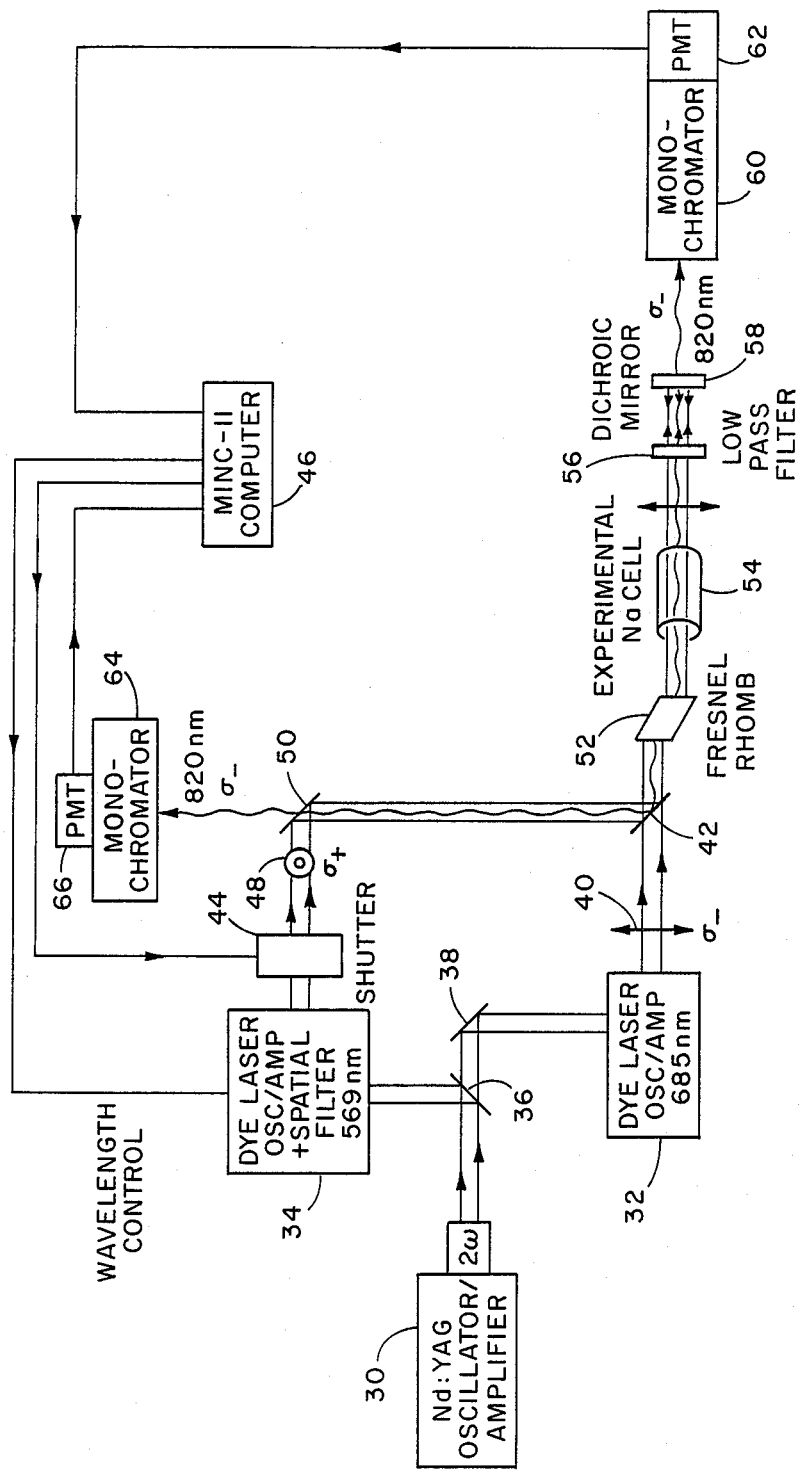
FIG. 2 is a block diagram of an embodiment of subject invention.
Figure 4A:
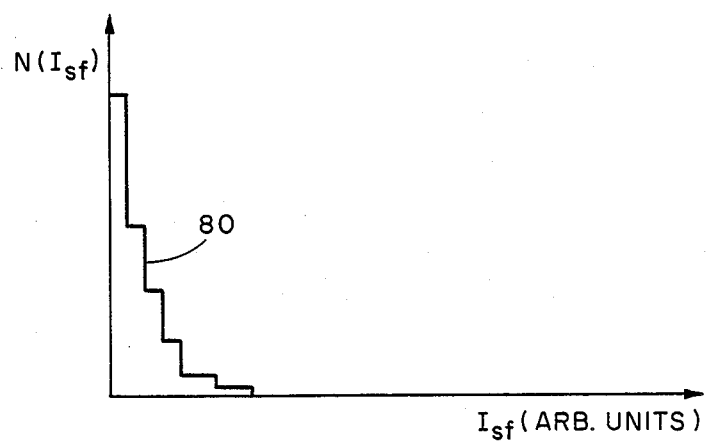
FIGS. 4(a) and 4(b) are the histrograms showing the switching action in the presence and absence of a compensating laser.
Figure 4B:
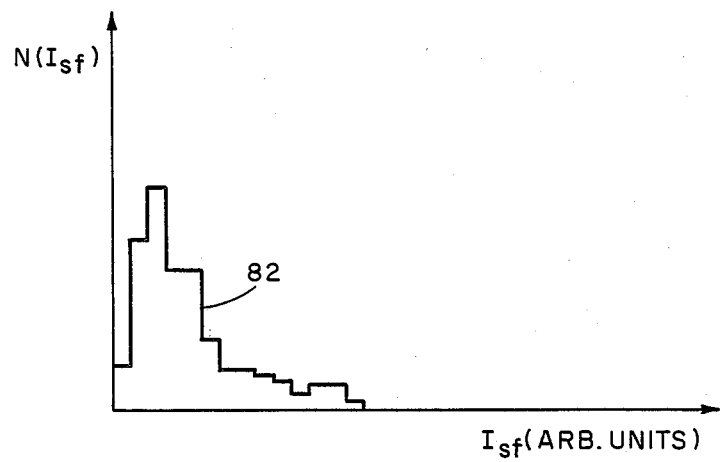

Referring to the drawings wherein like numbers represent like parts, FIG. 1 is a representation of the atomic transitions involved in an embodiment of subject invention. It should be noted that all the wavelengths for various photons as shown in the figures are written as whole numbers in terms of nm (1 nm = $10^{-9}$ meter) for simplicity and are a little different from the values used in the text. Furthermore, atomic states such as states a and c are designated as $|a>$ and $|c>$ respectively. As shown in FIG. 1, state 10 ($3S_{\frac{1}{2}}$) of sodium is excited by means of a laser to state 12 ($3D_{3/2}$, 5/2) with a large probability for $3D_{5/2}$ state to create population inversion with regard to state 14 ($3P_{3/2}$). Level 20 indicates halfway mark between two states (levels 10 and 12). As shown in FIG. 2, a compensating laser is tuned between states 16 and 18 which are $4D_{3/2}$ and $4D_{5/2}$ states of sodium so as to achieve forward/ backward enhancement of light of wavelength 819.6 nm as shown in FIG. 3. The switching action is depicted by the experimental data as shown in FIGS. 4(a) and 4(b).

FIG. 2 is a block diagram from an embodiment of the invention wherein a Q-switch Nd: YAG oscillator/amplifier 30 is used to energize laser 32 of fixed wavelength 685.5 nm which in turn is used to pump two-photons of wavelength 685.5 nm in order to achieve population inversion for $3D_{3/2, 5/2} - 3P_{3/2}$ transition. The output of laser/amplifier 30 which is preferably Nd: YAG oscillator/amplifier of wavelength 1.06 micron (1 micron = $10^{-6}$ meters) is used for pumping laser 32 which is also preferably called a "pump laser" and tunable wavelength laser 34 of wavelength tunable around 569 nm. The output of laser 30 is passed through beam splitter 36 and mirror 38 for energizing lasers 34 and 32 respectively. The light transmitted through beam splitter 36 is reflected by mirror 38 and is then used to energize dye laser 32 having a fixed wavelength 685.5 nm. The output of laser 32 is vertically polarized as shown by arrow 40 to give 685.5 nm radiation with a polarization of $\sigma-$ for a favorable quantum transition. This radiation is passed through a beam splitter 42. Light reflected from beam splitter 36 is used to energize compensating laser 34. Output of laser 34 is passed through a shutter 44 which is controlled by a computer 46 programmed to do so. The light from shutter 44 is horizontally polarized as shown by circle 48 to obtain 568.5 nm radiation with a polarization of $\sigma-$ for a favorable quantum transition. This radiation is then reflected by beam splitter 50. The light reflected by beam splitter 50 is again reflected by beam splitter 42. The output of beam splitter 42 now contains vertically polarized 685.5 nm radiation and horizontally polarized 568.5 nm radiation and is passed through a Fresnel rhomb 52 which acts as a polarizer and is then coupled to experimental sodium cell 54 which includes sodium vapor at a pressure of a millitorr (1 milli-torr = $10^{-3}$ mm of Hg). The cell provides the interaction region for obtaining an anisotropic medium. The output of cell 54 is passed through a low pass filter 56 which allows only light or radiation of wavelengths 568.5 nm and 819.6 nm to pass through. Dichroic mirror 58 allows only the light of wavelength 819.6 nm having polarization of $\sigma-$ to pass therethrough which is further monochromatized by monochromator 60 and which energizes photomultiplier 62. The output of photomultiplier 62 is used as one of the inputs to MINC-11 computer 46. The back scattered radiation of wavelength 819.6 nm inside sodium cell 54 is reflected by beam splitter 42 and then transmitted through beam splitter 50 and is further monochromatized by monochromator 64 which acts as a narrowband filter and is coupled to photo tube 66 having its output used as an another input for computer 46. Thus the outputs of photomultipliers 62 and 66 measure the forward and backward intensity of radiation of wavelength 819.6 nm with $\sigma-$polarization which is the quantum mechanically favored radiation for the transition. Computer 46 also controls the frequency of compensating dye laser 34 and thus controls the wavelength thereof.

In operation, the experimental set-up 30 which is an amplified Q-switched Nd: YAG laser is used to pump two dye lasers, oscillator/amplifier systems, 32 and 34. Pump laser 30 is tuned to the 3S-3D two photon transition of sodium at 685.5 nm. Compensating dye laser 34 is tunable to the $3P_{3/2}$-$4D_{3/2}$, 5/2 transition of sodium at 568.8 nm. Laser 32 which is commonly referred to as "pump laser" produces 3-n. sec. (1 n sec. is = $10^{-9}$ sec.) pulses at a 10 hertz (Hz) repetition rate with an energy of which 1 milli-joule per pulse after two stages of amplification. The pumping laser 32 is tightly focused in sodium cell 54 which operates at a pressure of a few milli-torrs (1 torr = 1 mm of Hg) of sodium. To insure a proper pumping into entire Doppler width, a counter propagating, two-photon pump scheme is utilized. Compensating laser operates in a single longitudinal cavity mode and is built following a standard design such as Littman's design. Tuning is accomplished by rotation of a grating (coarse tuning) and translation of an end reflector mounted on a piezoelectric translator (fine tuning). Both tuning mechanisms are controlled by computer 46. The pulse delivered by the compensating laser 34 has a duration of 5 n. sec. It is amplified in two stages and spatially filtered to obtain a smooth-beam profile with power densities in the interaction region as high as 20 megawatts per square centimeter (20 Mw/cm²). The pumping and compensating lasers 32 and 34 respectively are spatially and temporarily overlapped in the sodium cell 48.

Best compensation is obtained when lasers 32 and 34 are circularly polarized in opposite directions which is achieved by having the two dye lasers linearly polarized in the perpendicular direction and passing them through a Fresnel rhomb such as shown by numeral 52 which acts like an achromatic ¼ plate (a polarizer). The intensity fluctuations within a single pulse are high (up to 50%) for the pump laser and rather low (less than 10%) for the compensating laser. Shot-to-shot frequency fluctuations for the compensating laser 34 are of the order of 10 MHz which is small compared to 4D fine structure splitting. The superfluorsecent signals (forward and backward) are filtered by monochromators and detected with photomultipliers 62 and 66. The signals are then amplified, fed to analog-to-digital computers and processed by the computer 46. FIG. 3 shows the enhancement or amplitude of forward and backward radiation of wavelength 819.6 nm as a function of the frequency of the compensating laser 34. Curves 70 and 72 of FIG. 3 represent the experimental results for the forward and backward 819.6 nm radiation. The switching action is provided by the turning on and off of the compensating laser 34. Data are presented in the form of histrograms as shown in FIGS. 4(a) and 4(b) by plotting the number of shots giving rise to a given superfluoresence intensity versus the compensating laser intensity. The pump laser intensity was set to a high value in order to observe the superfluorescence in both directions without Doppler compensation. Upon turning on the compensating laser and adjusting its intensity so as to tune through $3P_2 \rightarrow 4D$ resonance, it is possible to observe an increase in the signal propagating in the forward direction and a decrease in the signal propagating in the backward direction. The compensating laser intensity is then adjusted to obtain the best forward/backward asymmetry. The pump laser intensity is then decreased so that in the absence of Doppler compensation no signal is detected in either direction. Finally, once the compensation conditions are applied, a signal in the forward direction is "switched on". The experimental results are shown in FIGS. 4(a) and 4(b) which represent a statistical average of 300 laser shots. FIG. 4(a) shows histogram 80 with a low-intensity pump laser source and compensating laser turned off which is a representation of a statistical average of 300 laser shots.. The distribution peaks at 0 signal which means that pumping rate of the 3D state is too low to allow superfluorescence to develop. As shown in FIG. 4(b), histogram 82 shows the results with the compensating laser turned on which indicates that the distribution no longer peaks at 0 and is extended much further away to higher intensities. This proves that the presence of the compensating laser has allowed the superfluorescence to develop. If we consider the mean value of the signal computed from the two histograms of FIG. 4(a) and 4(b), it indicates an increase by a factor of 4. This clearly indicates the on/off switching characteristic of the subject technique. Furthermore, no signal could be detected in the backward direction and the application of the compensation condition always leads to a decrease of this signal.

Briefly stated, a new method of "light-by-light switching" in a unidirectional and amplifying medium based on the method of Doppler compensation by velocity-dependent light shifts leads to a new switch, the time response of which is limited by the fact that the bandwidth of the compensating pulse has to be small compared to the Doppler width of the atomic vapor. These widths are generally of the order of gigahertz ($=10^9$ Hz) which means that the response time cannot be shorter than a few nanoseconds. The rise and fall times of the switching are determined by the rise and fall times of the superfluoresent pulse which is of the order of 1 nanosecond. Such a switch makes it a unique tool for applications in optical communications, ring lasers, Doppler-free directed superradiance and Doppler-free coherent transients.

Obviously, many modifications and variations of the subject invention are possible in the light of the above teachings. As an example, a gaseous medium other than sodium vapor can be used with properly selected pump laser and compensating laser. Furthermore, pump laser and compensating laser of different but of optimum wavelength can also be used. It should be noted further that all components of the system used can be interchanged with equivalents without deviating from the teachings of subject invention. It is, therefore, to be understood that within the scope of the appended claims, the invention may be practiced otherwise than as specifically described.

What is claimed is:

1. A light-induced switch which comprises:
   a gaseous medium having a multiple excited atomic states;
   a first laser means to be used as a pump laser for obtaining population inversion between a first preselected excited state and a lower second preselected excited state of said multiple excited atomic states of said gaseous medium to create amplified spontaneous emission (ASE) from the first preselected excited state to the second preselected state;
   a second laser means for compensating Doppler broadening of the transition between the second preselected excited state and the first preselected excited state of said multiple excited states, thus creating anisotropy in said amplified spontaneous emission; and
   means for switching on and off said second laser means to turn on and off anisotropic amplified spontaneous emission in said gaseous medium and thus generate a light-induced unidirectional switch.

2. The switch of claim 1 wherein said means for tuning on and off said anisotropic medium includes a shutter for switching on and off said compensating laser.

3. The switch of chaim 2 wherein said gaseous medium is sodium vapor at a relatively low pressure contained in a cell.

4. The switch of claim 2 wherein the relatively low pressure of sodium vapor in said cell is a few millitorrs.

5. The switch if claim 2 wherein the threshold of said switch is exceeded by requiring $g(\omega)$ l. $\Delta\omega$ to be greater than 20 so as to obtain amplified stimulated emission in said anisotropic amplifying medium.

6. A light-induced switch which comprises:
   a sodium vapor gaseous medium;
   a first laser means for obtaining population inversion between two preselected excited states $^3O_{3/2,5/2}$ $^3D_{5/2}$ and $^3P_{3/2}$ of said sodium vapor gaseous medium by pumping two photons of wavelength 685 nm generating amplified spontaneous emission (ASE) and thus providing an amplifying medium;
   a second laser means to be used as a compensating laser for tuning thereof between preselected excited state $^3P_{3/2}$ of said sodium vapor gaseous medium and preselected pair of $^4D_{5/2}$, $^4D_{3/2}$ excited states of said sodium vapor gaseous medium so as to compensate Doppler broadening of the transition between $^3D_{3/2,5/2}$ and $^3P_{3/2}$ in the forward direction and thus obtaining an anistropic amplified spontaneous emission; and
   means for turning on and off said second laser means to turn on and off said anistropic stimulated emission to obtain the light-induced unidirectional light switch.

* * * * *